(12) United States Patent
Stewart

(10) Patent No.: US 11,572,785 B2
(45) Date of Patent: Feb. 7, 2023

(54) DRILLING UNCERTAINTY REAL TIME UPDATES FOR ACCURATE WELL PLACEMENT

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 88 days.

(21) Appl. No.: 17/158,849

(22) Filed: Jan. 26, 2021

(65) Prior Publication Data
US 2022/0235654 A1    Jul. 28, 2022

(51) Int. Cl.
E21B 49/00 (2006.01)
E21B 44/00 (2006.01)
E21B 47/022 (2012.01)
G06F 17/18 (2006.01)

(52) U.S. Cl.
CPC ............ *E21B 49/003* (2013.01); *E21B 44/00* (2013.01); *E21B 47/022* (2013.01); *G06F 17/18* (2013.01); *E21B 2200/20* (2020.05)

(58) Field of Classification Search
CPC ........ E21B 49/003; E21B 49/00; E21B 47/02; E21B 47/022; E21B 2200/20
See application file for complete search history.

(56) References Cited

U.S. PATENT DOCUMENTS

| | | | |
|---|---|---|---|
| 6,549,854 B1 | 4/2003 | Malinvemo et al. | |
| 7,359,844 B2 | 4/2008 | Sung et al. | |
| 8,417,497 B2 | 4/2013 | Osypov et al. | |
| 8,892,407 B2 | 11/2014 | Budiman et al. | |
| 8,931,580 B2 | 1/2015 | Cheng et al. | |
| 9,593,558 B2 | 3/2017 | Sequeira et al. | |
| 10,323,499 B2 | 6/2019 | Dykstra et al. | |
| 2003/0046005 A1 | 3/2003 | Haarstad et al. | |

(Continued)

FOREIGN PATENT DOCUMENTS

WO    WO 01/42621    6/2001

OTHER PUBLICATIONS

De Wardt et al., "Wellbore collision avoidance and interceptions—State of the art," SPE/IADC 163411, presented at the SPE/IADC Drilling Conference, Amsterdam, The Netherlands, Mar. 5-7, 2013, 12 pages.

(Continued)

*Primary Examiner* — Kristyn A Hall
(74) *Attorney, Agent, or Firm* — Fish & Richardson P.C.

(57) ABSTRACT

Systems and methods include a method used in drilling wells. A three-dimensional (3D) uncertainty cube is generated for a subsurface geological structure containing a well target for drilling operations of a well. The 3D uncertainty cube defines an uncertainty of a geological position relative to a 3D structural model. The 3D uncertainty cube is dynamically updated in real time while drilling the well, including parameterizing the 3D uncertainty cube for a distance ahead of a drill bit. A probability that the well target will be hit is determined using the 3D uncertainty cube. The drilling operations of the well are dynamically re-planned and re-steered based on the updated 3D uncertainty cube, including updating a direction of the drilling operations of the well using the 3D uncertainty cube and the probability. Drilling and acquiring new information are continued to iteratively continue dynamic updates and continued drilling.

20 Claims, 6 Drawing Sheets

(56) References Cited

U.S. PATENT DOCUMENTS

2003/0101033 A1    5/2003   Torkildsen
2013/0144531 A1    6/2013   Johnston
2016/0025877 A1    1/2016   Ramfjord et al.

OTHER PUBLICATIONS

Difeng et al., "A new calculation approach of wellbore separation factor based on the relative position of adjacent wells," Petroleum Exploration and Development, Feb. 2020, 47(1):196-203.

Goodman et al., "Reconciling subsurface uncertainty with the appropriate well design using the mechanical Earth model (MEM) approach," The Leading Edge, May 2007, 26(5):545-672.

Leahy et al., "Uncertainty in subsurface interpretation: a new workflow," First Break, Sep. 2013, 31:87-93.

McCann et al., "Horizontal Well Path Planning and Correction Using Optimization Techniques," Journal of Energy Resources Technology, Sep. 2001, 123:187-193.

Tacher et al., "Geological uncertainties associated with 3-D subsurface models," Computers & Geosciences, 2006, 32:212-221.

Thompson et al., "Designing and validating 2D reservoir models," SPE-188066-MS, presented at the SPE Kingdom of Saudi Arabia Annual Technical Symposium and Exhibition, Dammam, Saudi Arabia, Apr. 24-27, 2017.

Thore et al., "Structural uncertainties: Determination, management and applications," Geophysics, May-Jun. 2002, 67(3):840-852.

Wang et al., "Optimal well placement under uncertainty using a retrospective optimization framework," SPE Journal, Mar. 2012, 112-121.

Wellmann et al., "Validating 3-D structural models with geological knowledge for improved uncertainty evaluations," Energy Procedia, 2014, 59:374-381.

Suter et al., "Novel principles for effective Earth model grid management while geosteering," University of Stavanger, Faculty of Science and Technology, Department of Energy Resources, Sep. 2018, 170 pages.

PCT International Search Report and Written Opinion in International Appln. No. PCT/US2022/013659, dated May 3, 2022, 16 pages.

DRILLING UNCERTAINTY REAL TIME UPDATES FOR ACCURATE WELL PLACEMENT

BACKGROUND

Technical Field

The present disclosure applies to drilling wells.

Background

Drilling new wells is typically a part of any kind of subsurface resources project, including oil and gas production, water management, and mineral exploration. Wells may attain a considerable depth, for example, several kilometers below the surface. During drilling operations, there may be significant uncertainty in the well results. For example, the uncertainty can include whether or not the well hits the intended geological target, which can affect the utility of the well itself. In some cases, uncertainties can arise from two independent sources. The first independent source (which may be a smaller component of the overall uncertainty) includes measurement errors in the positioning of the well itself. The second independent source (and larger component) is an uncertainty in the geological structure that occurs at the great depths to which wells are drilled. The geological uncertainty itself includes several components, such as the shape and depth of geological layers of interest, the rock type, and the type of fluids that occupy the rock pore spaces. Only the spatial components of geological uncertainty (depth, orientation, and shape) are of relevance to the present disclosure.

Uncertainty associated with drilling new wells is well known in conventional systems. Possible adverse impacts of drilling uncertainty can include wells being off-target in that the well is not placed optimally in relation to the perceived subsurface geological target. Being off-target can result in a requirement for the well to be re-drilled, either partially in the form of a sidetrack, or completely in the form of a new well. Re-drilling to achieve a missed target can result in additional project costs and can delay multiple projects, as a drilling rig may be delayed in moving to the next planned well.

SUMMARY

The present disclosure describes techniques for managing spatial uncertainty in relation to planning and drilling wells. In particular, the techniques relate to optimizing well placement in a three-dimensional (3D) environment. The techniques include systems and methods that can be used, for example, by petro-technical software companies who support well planning and operational updates.

In some implementations, a computer-implemented method includes the following. A three-dimensional (3D) uncertainty cube is generated for a subsurface geological structure containing a well target for drilling operations of a well. The 3D uncertainty cube defines an uncertainty of a geological position relative to a 3D structural model. The 3D uncertainty cube is dynamically updated in real time while drilling the well, including parameterizing the 3D uncertainty cube for a distance ahead of a drill bit. A probability that the well target will be hit is determined using the 3D uncertainty cube. The drilling operations of the well are dynamically re-planned and re-steered based on the updated 3D uncertainty cube, including updating a direction of the drilling operations of the well using the 3D uncertainty cube and the probability. Drilling and acquiring new information are continued to iteratively continue dynamic updates and continued drilling.

The subject matter described in this specification can be implemented in particular implementations, so as to realize one or more of the following advantages. A method (for example, defined by a workflow) can be used to help operations geologists and a drilling team to update a planned well path as a well is drilled. The well can be steered accordingly, in light of changes in uncertainty ahead of the drill bit identified using subsurface information received from the well itself. The steering can be used to facilitate accurate placement of all wells drilled in the context of exploration, development, and production settings, for any kind of project be it hydrocarbon or geothermal and so on. This can eliminate the requirement to re-drill wells that have missed their target. Conventional techniques may focus on positional uncertainty of the wellbore, real-time updates to a 3D geological model, or a description of subsurface uncertainty at specific horizons. For example, the term real-time can correspond to events that occur within a specified period of time, such as within 1-5 minutes. Conventional techniques typically do not describe uncertainty in a 3D volume or update an uncertainty description in real time to refine the well path to increase the chance of target achievement. The conventional techniques may be built using commercial software, for example, Petrel, Move, and DUG, which do not allow for the handling of uncertainty in a 3D cube. However, use of the techniques of the present disclosure can reduce or eliminate the requirement to drill sidetracks or new wells in the event that geological targets are missed due to structural uncertainty. As a result, the techniques of the present disclosure can apply to operations of companies involved with drilling wells where intersecting a geologically-defined target is important. The techniques of the present disclosure can be used to capture uncertainty of a geological position at all points in the subsurface within an area of interest in a 3D grid or cube. This cube itself can be used to check well plans against target achievement before and during the drilling operation, since a key aspect is that both the uncertainty cube parameters and the well track itself are updated in real time. The uncertainty cube can also be used to document uncertainty at the well planning stage, in the form of depth ranges at which geological strata are prognosed, and could be used to give uncertainty ranges on the shape and size of geological structures and therefore commercial value estimates. Either of these applications could be implemented before drilling, or updated dynamically during drilling.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
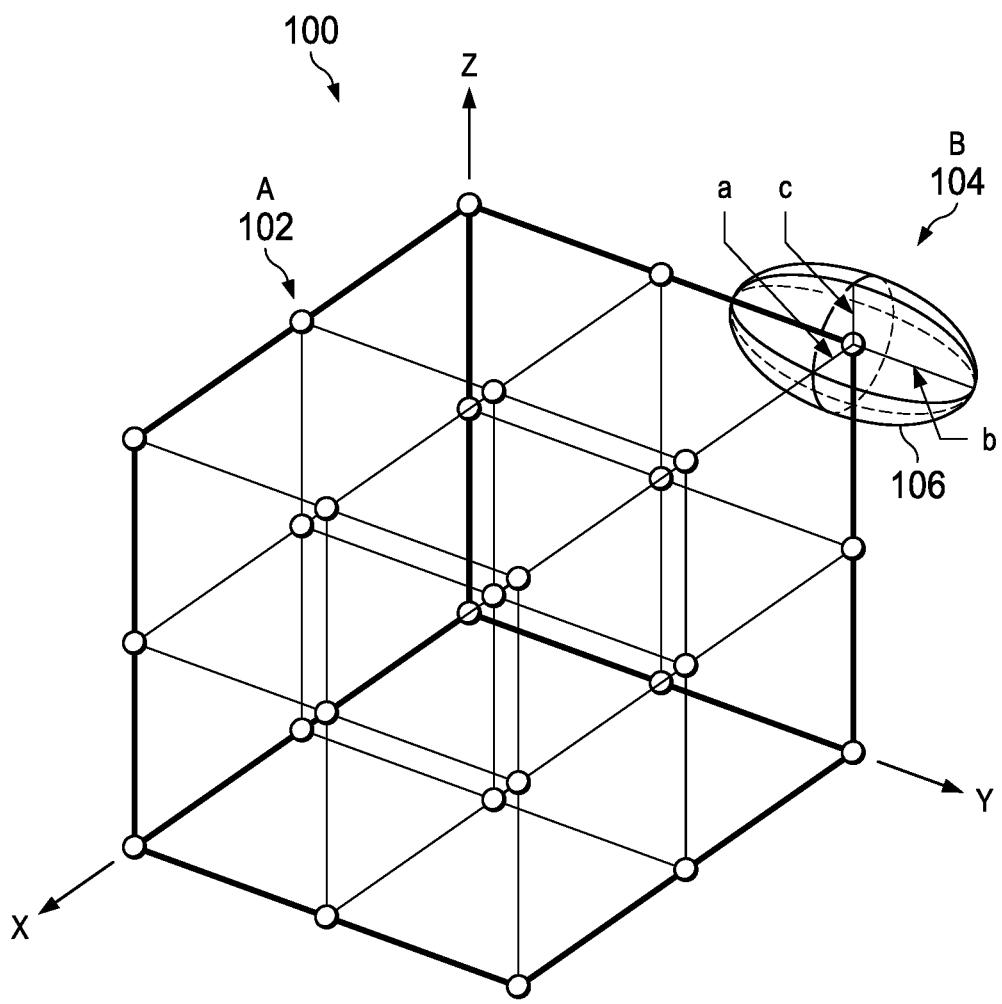
FIG. 1 is a diagram of an example of a three-dimensional (3D) uncertainty cube, according to some implementations of the present disclosure.

The following detailed description describes techniques for managing spatial uncertainty in relation to planning and drilling wells. In particular, the techniques relate to optimizing well placement in a three-dimensional (3D) environment. For example, the drilled well and remaining well path ahead of the drill bit can be continually checked against a 3D uncertainty cube to determine a probability that the well target will be hit. The 3D uncertainty cube itself can be continually updated and refined by new information as the well progresses.

Techniques of the present disclosure can be used to capture the spatial components of geological uncertainty, including the position and shape, in a 3D uncertainty cube. The 3D uncertainty cube can be represented as a 3D grid in which grid nodes are co-located with grid nodes that describe a 3D geological model. The 3D uncertainty cube can exist as a separate entity or can be appended to the 3D geological model as attributes at each grid node. Another aspect of the present disclosure is a workflow used to update the 3D uncertainty cube in real time, such as while a well is drilled, in order to accommodate new information being returned from the drill bit, which might change the previously estimated depth or orientation of the geological strata. The term real time can correspond to events that occur within a specified period of time, such as within a few seconds (for example, under five seconds), or within 1-5 minutes. In practice, this time interval is constrained by the data transmission system from the drillbit back to the surface rig site. The real-time information can include new information as the well is drilled deeper, effectively providing a line of near-zero uncertainty within the 3D uncertainty cube, with a specified radius of influence. The continually updated 3D uncertainty cube can be used in conjunction with updates to the real-time geological model to re-assess the validity of the planned well path against well objectives in order to ensure that the well will hit the target in a first attempt. Doing so can eliminate the need to re-drill the well. Geo-steering technology can also be used in which the yet-to-be-drilled part of a well path is re-planned in real time and the drill bit is adjusted within the hole while drilling to follow a new planned well path. The real-time-updated 3D uncertainty cube, in conjunction with real-time geological model update and geo-steering technology, can reduce drilling costs in subsurface management projects through a reduction in the number of off-target wells.

A 3D description can be created and used to represent and track the uncertainty in the position of subsurface geological structures in which well targets are located. The drilled well and remaining well path ahead of the drill bit can be continually checked against the 3D uncertainty cube to determine a probability that the target will be hit. The 3D uncertainty cube itself can be continually updated and refined by new information as the well progresses.

The present disclosure includes two aspects that are improvements over conventional systems. The first aspect is capturing an uncertainty of the geological position at all points in the subsurface within the area of interest in a 3D grid or cube. This cube can be used to check well plans against target achievement. The second aspect includes updating the 3D uncertainty cube in real time, recognizing the impact of the drilled well on uncertainty. Updating can include: 1) reducing an uncertainty to zero or very small values along the drilled well path itself with a decay of this update to pre-drill uncertainty values at a distance from the drilled part of the well, and ahead of the drill bit; and 2) reconfiguring the 3D uncertainty cube if necessary in light of the actual subsurface structure as encountered in the well, which may reposition the reference surfaces from which the 3D uncertainty cube was derived.

In some implementations, a prototype can be developed that is coded and constructed in the form of a software algorithm. The algorithm can be a standalone new software product or can work in conjunction with a Petro-technical software house such as Schlumberger or Petroleum Experts (for example, as a module within an existing platform such as PETREL or MOVE).

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Conventional systems have partially addressed the problem of uncertainty associated with drilling new wells by providing technology and workflows for quantifying the uncertainty, in 3D space, of the drill bit alone. The present disclosure provides a key missing element to the workflows in the form of a full description, in 3D space, of the geological uncertainty as well. The present disclosure also provides a method for updating this uncertainty description in real time as the drill bit progresses, locally modifying the uncertainty around the newly-drilled well. As a result, a full workflow can be implemented, incorporating drill bit positional uncertainty, real-time geological model updates, and a 3D geological uncertainty real-time update. These features can facilitate checking and (if necessary) re-planning well trajectories during drilling operations, taking full account of the uncertainties ahead of the drill bit and incorporating all updates available from the drill bit progress up to that point.

Uncertainty of subsurface geological structure, in the context of drilling wells, refers to uncertainty in the lateral and vertical positioning and shape of geological structures that may contain the target of said wells. Subsurface structural uncertainty is non-zero everywhere except along wellbores. Uncertainty can be quantified and stored in a 3D cube consisting of a set of 3D grid nodes in a computer model of the project area of interest. This is the same method of information storage as the description of geological structure itself, which can be represented in a 3D grid or cube. Specifically, uncertainty can be quantified in this context as a full 3D description of positional uncertainty of geological structure at each point in the 3D grid (or cube) that models the subsurface. These positional uncertainty parameters can be derived from multiple realizations of seismic interpretation and depth conversions of key subsurface geological layers. The number and choice of layers can be at an expert user's discretion and should be sufficient to represent the general subsurface structure in 3D. This approach is a standard workflow used in the definition of the geological model itself. Multiple versions of these surfaces, based on allowable but different interpretations, velocity models, and depth conversions, can be aggregated in between existing well tie points (where the uncertainty reduces to zero). This approach can yield depth uncertainty (or the vertical component of uncertainty). The lateral component of uncertainty can be estimated by combining two separate approaches, first interpreting on seismic volumes that have been produced with different migration algorithms, if available, and second by comparing the position of interpreted geological markers such as faults on multiple seismic volumes. Overall, this quantification of 3D uncertainty can take the form of vertical and lateral position errors (of the geological structure) parallel to the grid direction (in the x, y and z directions, as shown in FIG. 1).

FIG. 1 is a diagram of an example of a 3D uncertainty cube 100, according to some implementations of the present disclosure. For example, the 3D uncertainty cube 100 can be a 3D grid comprised of equidistant nodes, including point A 102, defined in a Cartesian (x,y,z) coordinate system. At each grid node, a set of parameters can be used to quantify the spatial uncertainty at that point (for example at point B 104, using parameters 106 of a,b,c).

Alternatively, the 3D description at each grid node can be more complex, consisting of an ellipsoid whose semi-axes are not required to be equal in length nor be parallel to the grid directions. These uncertainty parameters (for example, ellipsoid semi-axes) can include one or more probabilistic measures such as P10, Pmean, or standard deviation of the possible positions of the geological entity relative to the subject grid node. The 3D structural uncertainty cube can be thought of as a static or fixed model that can be used to assess the structural risk and volume aspects of a prospect or delineation opportunity. The 3D structural uncertainty cube can also yield the full-wellbore depth uncertainty for formation top prognoses during well planning. The principal application of the 3D uncertainty cube is, however, in a dynamic sense, during the drilling of the planned well. The term "dynamically" as used herein, generally means that the appropriate processing is determined at run-time based upon the appropriate information. The 3D uncertainty cube can be implemented by combining, at any moment desired, the uncertainty in drill bit position projected forward along the planned well track, with the geological uncertainty where the geological layer of interest intersects the planned well track. The combined uncertainty can be compared with allowable drift from the planned well target. For example, if the uncertainty exceeds this tolerance, the planned well path can be adjusted to ensure the target will be hit under all scenarios represented by the 3D uncertainty cube.

Figure 2A:
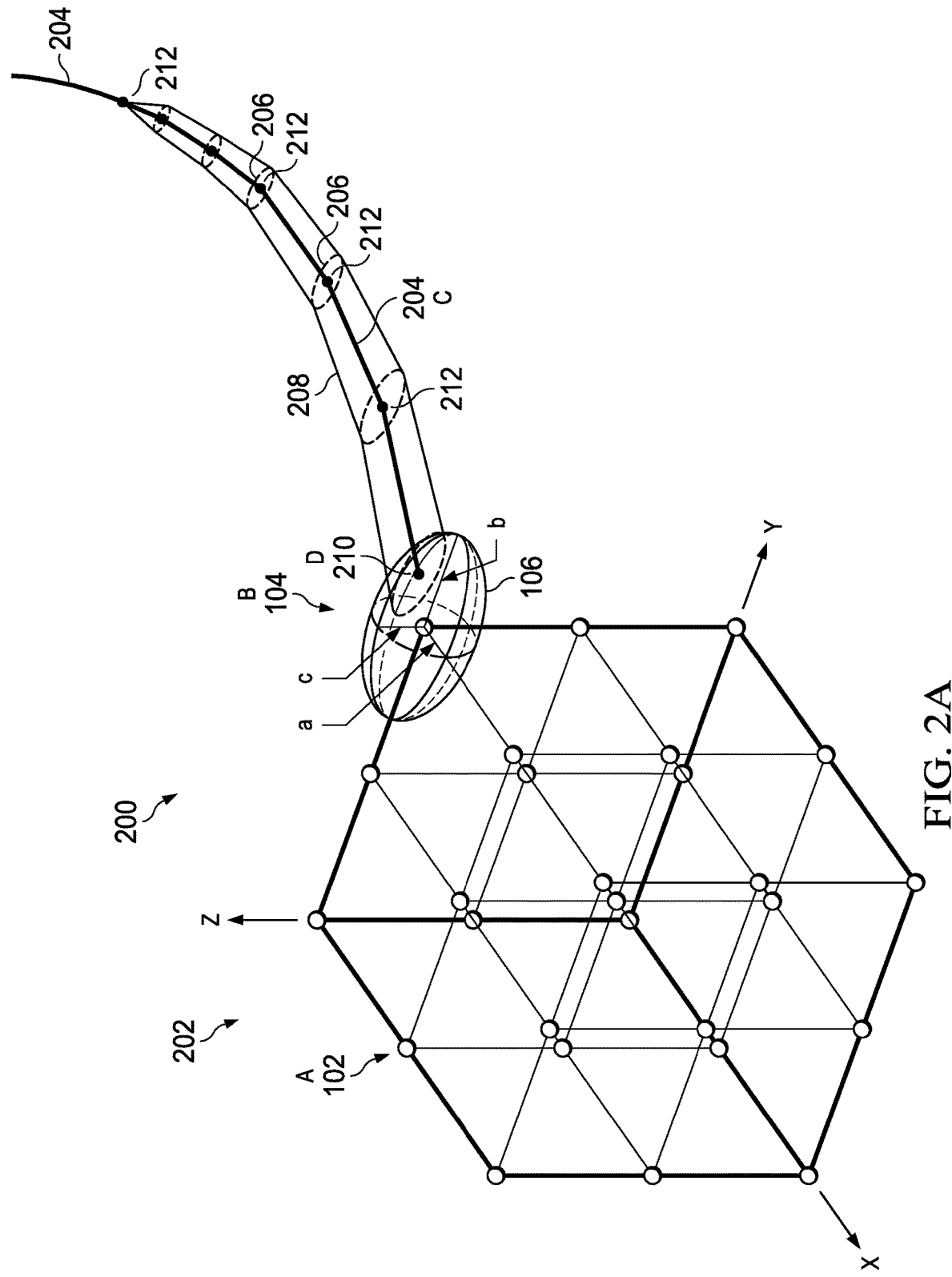
FIGS. 2A and 2B are diagrams collectively showing examples of scenarios of a 3D uncertainty cube interaction with drilling well, according to some implementations of the present disclosure.
Figure 2B:
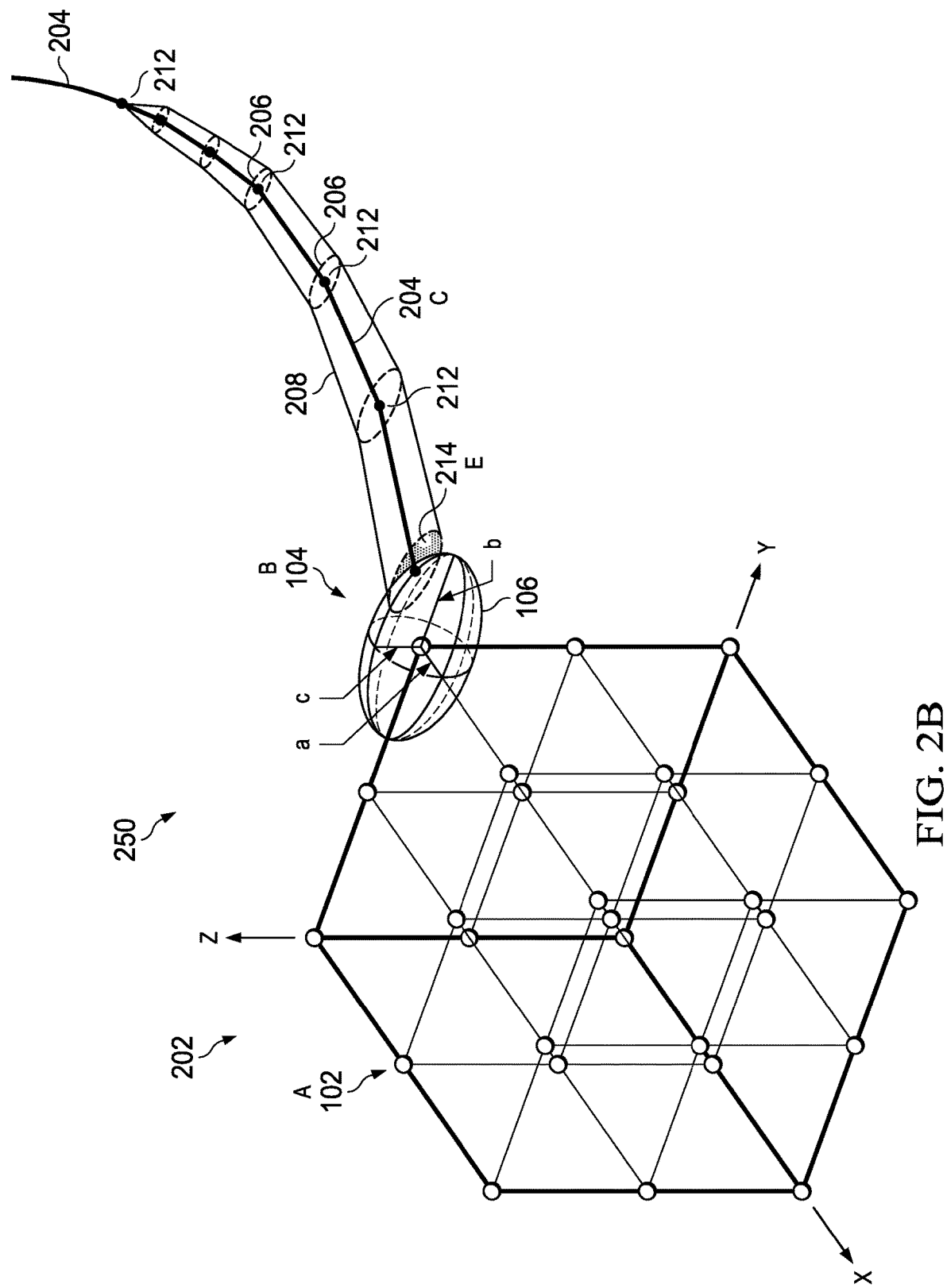

FIGS. 2A and 2B are diagrams collectively showing examples of a scenario 1 200 and a scenario 2 250 of an uncertainty cube 202 interaction with drilling well, according to some implementations of the present disclosure. As described in FIG. 1, the grid nodes in the 3D uncertainty cube, including point A 102, are points in space where the uncertainty is defined in terms of lateral and vertical position uncertainty (for example, point B 104). In scenario 1 200, a wellbore C 204 is drilled, with its own positional uncertainty represented by ellipses of uncertainty 206 that form a cone of uncertainty 208 around the well path. The cone of uncertainty 208 is entirely within the geological spatial uncertainty represented by the 3D uncertainty cube at the target grid node D 210 so that target should be hit under all circumstances. Target grid node D 210 can be one of several survey points 212. Scenario 2 250 shows a case where the wellbore cone of uncertainty 208 is partially outside the geological spatial uncertainty represented by the 3D uncertainty cube 202 at a target grid node E 214. As a result, the target may be missed and the well path should be adjusted before the drill bit arrives in the vicinity of the target.

The reason that the 3D uncertainty cube is dynamic (that is, it should be updated) in real time as a well is drilled is that, as the drill bit confirms the actual position of geological reference layers, these layers will almost invariably be found to be at different depths and orientations from those predicted prior to drilling. To accommodate these variations, the 3D geological model can be updated in real time. The 3D uncertainty model can also be updated, because the anchor points (including geological reference surfaces) have been updated, and the uncertainty values can be reduced to zero, for example, along the well path itself.

Figure 3:
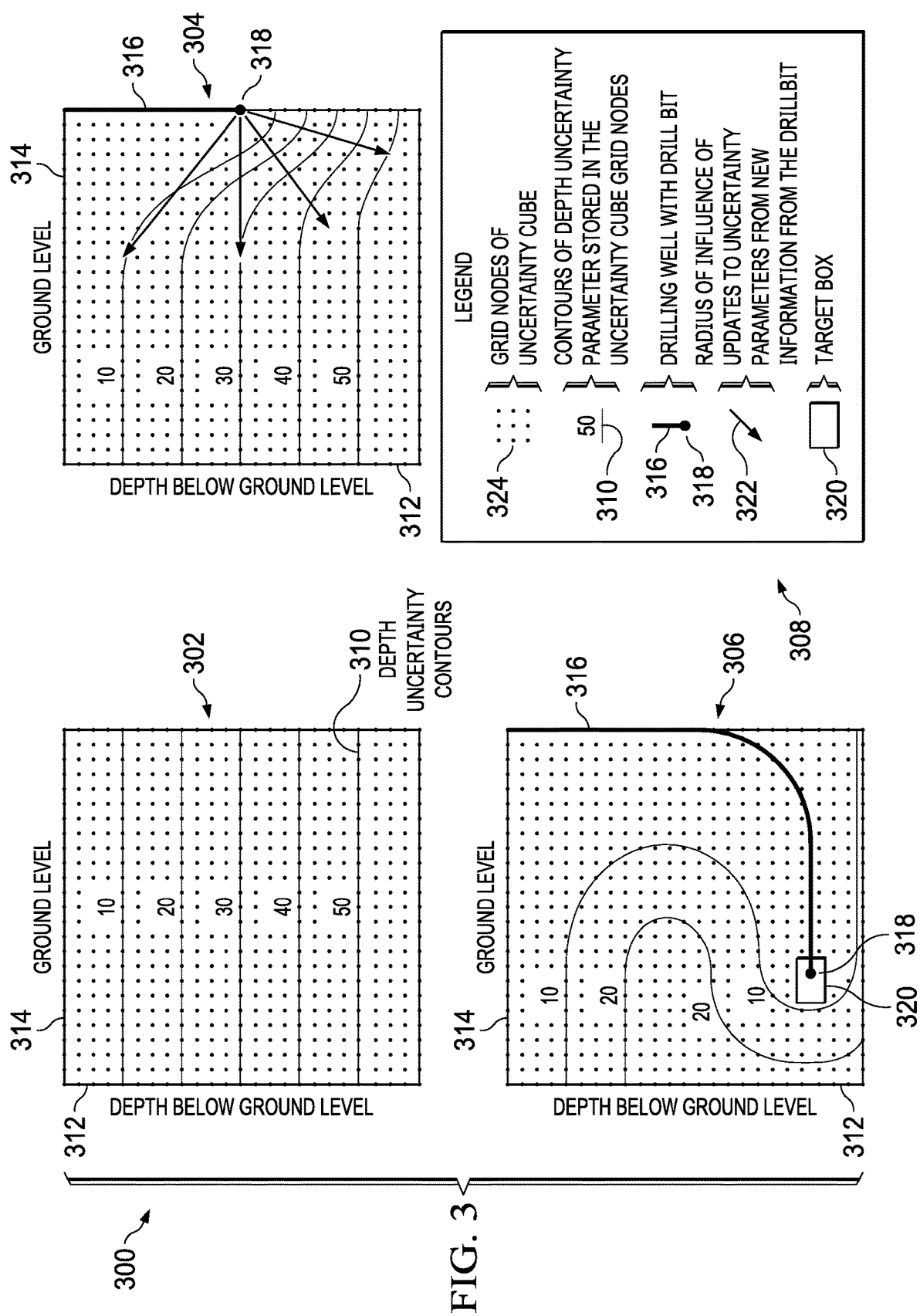
FIG. 3 is a diagram showing examples of vertical components of depth uncertainty varying as a well is drilled, according to some implementations of the present disclosure.

FIG. 3 is a diagram showing examples 300 of vertical components of depth uncertainty varying as a well is drilled, according to some implementations of the present disclosure. The examples 300 represent a single cross-section through a 3D uncertainty cube, the section contains the path of a drilling well. The examples 300 include conditions 302, 306, and 306, and a legend 308. Condition A 302 is a pre-well condition, showing depth uncertainty contours 310 at depths 312 below ground level 314. The units are generic and can represent feet or meters, for example. In this condition, a vertical component of uncertainty can be contoured in depth units of choice (for example, feet or meters). Condition B 304 is a condition as a well is drilled, the uncertainty is modified around the wellbore 316 including in the volume immediately ahead of the drill bit 318. Condition C 306 is a condition as the well continues to modify the uncertainty description as the well is steered along the planned or modified well path.

The planned well path can then be examined in the updated 3D uncertainty cube to determine if the target (at target box 320) will still be hit within the remaining uncertainty, or whether the well path should be adjusted. The updated well path can be followed by adjustments in the drill bit orientation (for example, using geo-steering) which is a well-known technology. In addition to preventing the need to re-drill towards a missed target, this workflow ensures that adequate engineering materials are available for well construction, especially in the case of non-vertical and 3D wells, by capturing the extreme scenarios of well length under all combinations of geological and well positioning uncertainty. The legend 308 defines elements of condition A 302, condition B 304, and condition C 306, including radius of influence 322 (of updates to uncertainty parameters using new information from the drill bit) and grid nodes 324 of the 3D uncertainty cube.

An efficient process for updating the 3D uncertainty cube, enabling the 3D uncertainty cube to be dynamically updated in real time, is now described. A new well perturbs the 3D uncertainty cube as it is drilled, introducing a new line of zero uncertainty, effectively in real time if logging while drilling (LWD) techniques are used. Since the 3D uncertainty information will be dynamically altered by this new well, an efficient method of updating the 3D uncertainty is required so the cube can be revised with each new increment of well information. Rather than repeatedly revisiting multiple depth conversions and seismic interpretations, which is unnecessary until the actual geological reference surfaces are found to be outside their expected positional uncertainty, a functional description of the 3D uncertainty cube can be used. This can be achieved by parameterizing the 3D uncertainty cube with a multivariate interpolation algorithm such as tri-cubic interpolation. Now, the multivariate uncertainty interpolation can be rerun honoring a new zero line along the drilling wellbore and generating a new uncertainty description in the volume around the well out to a prescribed radius at which the model remains unperturbed by the new well. The updated uncertainty description also extends some distance ahead of the drill bit. The multivariate interpolation may have to be rebased, however, if a new well encounters significant and systematic drift of actual from the Pmean predicted structure depth. The overall workflow represents a four-dimensional (4D)) treatment of structural uncertainty in that it is updated dynamically during the drilling operation (a fourth dimension of time). It is equally applicable to vertical (1D), 2D and 3D wells and can be used in conjunction with workflows for real-time structural model updates.

Figure 4:
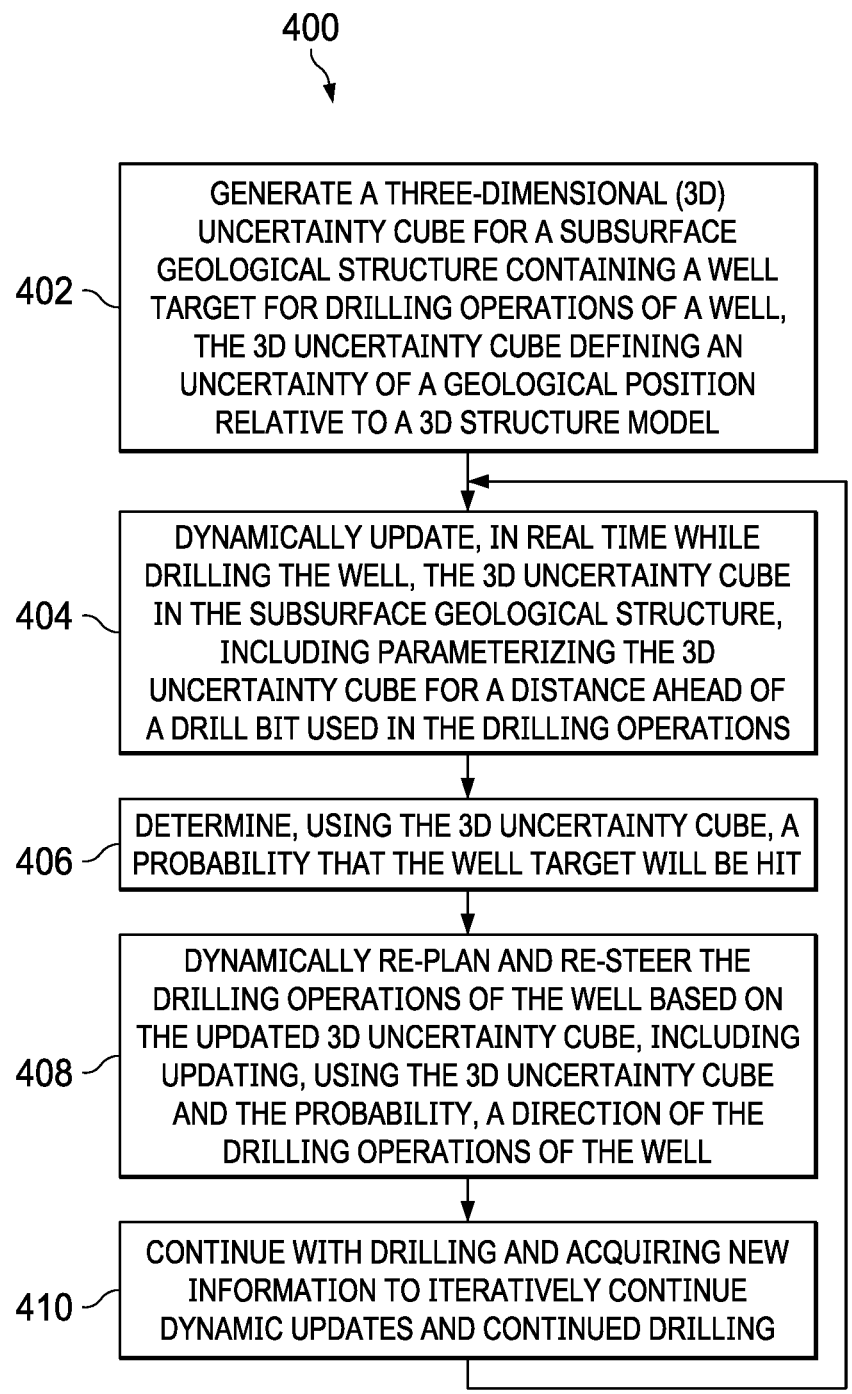
FIG. 4 is a flowchart of an example of a method for generating and dynamically updating a 3D uncertainty cube used in drilling operations for accurate well-drilling placement, according to some implementations of the present disclosure.

FIG. 4 is a flowchart of an example of a method 400 for generating and dynamically updating a 3D uncertainty cube used in drilling operations for accurate well-drilling placement, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a 3D uncertainty cube is generated for a subsurface geological structure containing a well target for drilling operations of a well. The 3D uncertainty cube defines an uncertainty of a geological position relative to a 3D structural model. The 3D uncertainty cube that is generated can be the 3D uncertainty cube described with reference to FIG. 2A, for example. From 402, method 400 proceeds to 404.

At 404, the 3D uncertainty cube in the subsurface geological structure is dynamically updated in real time while drilling the well, including parameterizing the 3D uncertainty cube for a distance ahead of a drill bit used in the drilling operations. As an example, dynamically updating the 3D uncertainty cube can include reducing, in the 3D uncertainty cube, an uncertainty along a drilled well path around and ahead of the drill bit. As an example, reducing the uncertainty along the drilled well path around and ahead of the drill bit can include reducing the uncertainty to zero or to near zero values. Dynamically updating the 3D uncertainty cube can include reconfiguring the 3D uncertainty cube in light of an actual subsurface structure encountered in the well. Dynamically updating the 3D uncertainty cube can include using LWD information.

In some implementations, dynamically updating the 3D uncertainty cube includes using a multivariate tri-cubic interpolation algorithm to define a new zero line along a drilling wellbore and generating a new uncertainty description in a volume around the well out to a prescribed radius at which the model remains unperturbed by the new well. For example, the multivariate interpolation may have to be rebased if a new well encounters significant and systematic drift of an actual depth from the Pmean predicted structure depth. An overall workflow for drilling operations in this case can represents a 4D treatment of structural uncertainty in that the uncertainty is updated dynamically during the drilling operation (introducing a fourth dimension of time). The use of multivariate interpolation can also apply to vertical (1D), 2D, and 3D wells, and can be used in conjunction with workflows for real-time structural model updates. From 404, method 400 proceeds to 406.

At 406, a probability that the well target will be hit is determined using the 3D uncertainty cube. For example, the probability of hitting the target area 320 can be calculated based on the uncertainty cube 202 and the ellipses of uncertainty 206. From 406, method 400 proceeds to 408.

At 408, the drilling operations of the well are dynamically re-planned and re-steered based on the updated 3D uncertainty cube, including updating a direction of the drilling operations of the well using the 3D uncertainty cube and the probability. For example, the direction in which the wellbore C 204 is drilled can be changed based on the probability and other special information corresponding to the uncertainty cube 202 and the ellipses of uncertainty 206. After 408, method 400 proceeds to step 410.

At 410, drilling continues on, and new information is acquired to iteratively continue dynamic updates and continued drilling. For example, method 400 can resume at step 404. After the well is completed, method 400 can stop.

In some implementations, method 400 further includes repositioning reference surfaces from which the 3D uncertainty cube was derived. For example, engineers can change reference points on the surface on which are based coordinates of the uncertainty cube 202, or the uncertainty cube 202 can be re-generated based on the probability, information corresponding to the uncertainty cube 202, and the ellipses of uncertainty 206.

Figure 5:
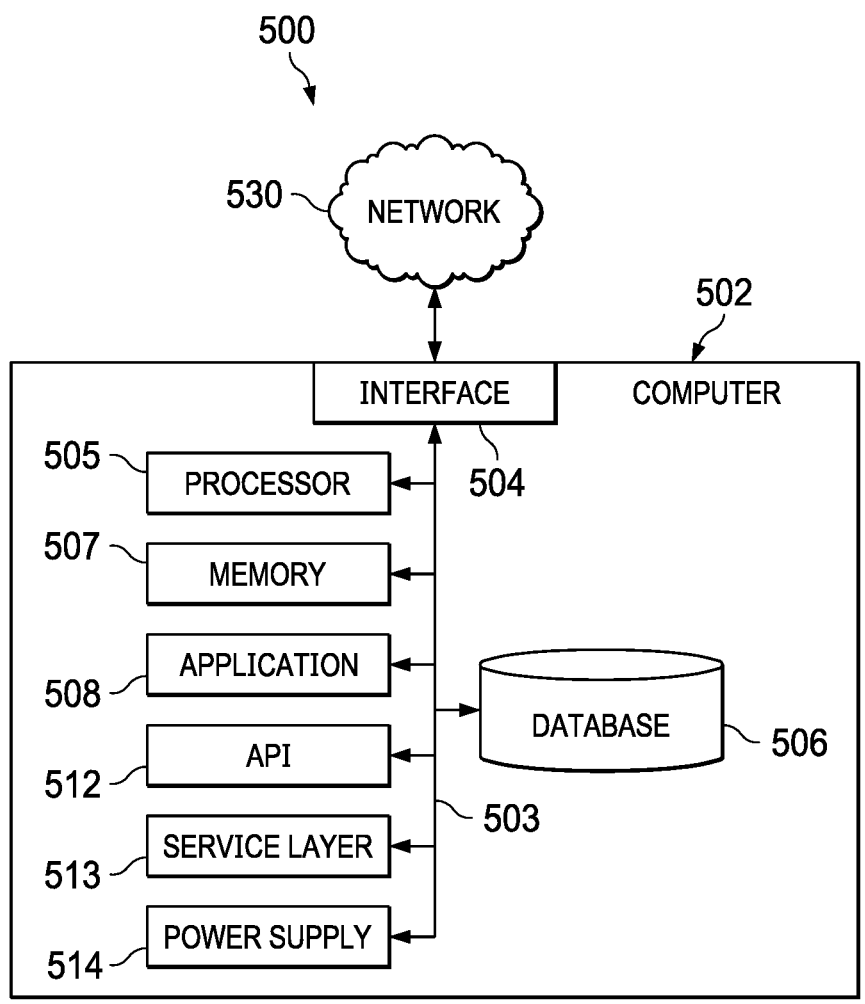
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A three-dimensional (3D) uncertainty cube is generated for a subsurface geological structure containing a well target for drilling operations of a well. The 3D uncertainty cube defines an uncertainty of a geological position relative to a 3D structural model. The 3D uncertainty cube is dynamically updated in real time while drilling the well, including parameterizing the 3D uncertainty cube for a distance ahead of a drill bit. A probability that the well target will be hit is determined using the 3D uncertainty cube. The drilling operations of the well are dynamically re-planned and re-steered based on the updated 3D uncertainty cube, including updating a direction of the drilling operations of the well using the 3D uncertainty cube and the probability. Drilling and acquiring new information are continued to iteratively continue dynamic updates and continued drilling.

The foregoing and other described implementations can each, optionally, include one or more of the following features:

A first feature, combinable with any of the following features, where dynamically updating the 3D uncertainty cube includes reducing, in the 3D uncertainty cube, an uncertainty along a drilled well path around and ahead of the drill bit.

A second feature, combinable with any of the previous or following features, where dynamically updating the 3D uncertainty cube includes reconfiguring the 3D uncertainty cube in light of an actual subsurface structure encountered in the well.

A third feature, combinable with any of the previous or following features, the method further including repositioning reference surfaces from which the 3D uncertainty cube was derived.

A fourth feature, combinable with any of the previous or following features, where reducing the uncertainty along the drilled well path around and ahead of the drill bit includes reducing the uncertainty to zero or to near zero values.

A fifth feature, combinable with any of the previous or following features, where dynamically updating the 3D uncertainty cube includes using logging while drilling (LWD) information.

A sixth feature, combinable with any of the previous or following features, where dynamically updating the 3D uncertainty cube includes using a multivariate tri-cubic interpolation algorithm to define a new zero line along a drilling wellbore and generating a new uncertainty description in a volume around the well out to a prescribed radius at which the model remains unperturbed by the new well.

In a second implementation, a non-transitory, computer-readable medium stores one or more instructions executable by a computer system to perform operations including the following. A three-dimensional (3D) uncertainty cube is generated for a subsurface geological structure containing a well target for drilling operations of a well. The 3D uncertainty cube defines an uncertainty of a geological position relative to a 3D structural model. The 3D uncertainty cube is dynamically updated in real time while drilling the well, including parameterizing the 3D uncertainty cube for a distance ahead of a drill bit. A probability that the well target will be hit is determined using the 3D uncertainty cube. The drilling operations of the well are dynamically re-planned and re-steered based on the updated 3D uncertainty cube, including updating a direction of the drilling operations of the well using the 3D uncertainty cube and the probability. Drilling and acquiring new information are continued to iteratively continue dynamic updates and continued drilling.

The foregoing and other described implementations can each, optionally, include one or more of the following features:

A first feature, combinable with any of the following features, where dynamically updating the 3D uncertainty cube includes reducing, in the 3D uncertainty cube, an uncertainty along a drilled well path around and ahead of the drill bit.

A second feature, combinable with any of the previous or following features, where dynamically updating the 3D uncertainty cube includes reconfiguring the 3D uncertainty cube in light of an actual subsurface structure encountered in the well.

A third feature, combinable with any of the previous or following features, the operations further including repositioning reference surfaces from which the 3D uncertainty cube was derived.

A fourth feature, combinable with any of the previous or following features, where reducing the uncertainty along the drilled well path around and ahead of the drill bit includes reducing the uncertainty to zero or to near zero values.

A fifth feature, combinable with any of the previous or following features, where dynamically updating the 3D uncertainty cube includes using logging while drilling (LWD) information.

A sixth feature, combinable with any of the previous or following features, where dynamically updating the 3D uncertainty cube includes using a multivariate tri-cubic interpolation algorithm to define a new zero line along a drilling wellbore and generating a new uncertainty description in a volume around the well out to a prescribed radius at which the model remains unperturbed by the new well.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A three-dimensional (3D) uncertainty cube is generated for a subsurface geological structure containing a well target for drilling operations of a well. The 3D uncertainty cube defines an uncertainty of a geological position relative to a 3D structural model. The 3D uncertainty cube is dynamically updated in real time while drilling the well, including parameterizing the 3D uncertainty cube for a distance ahead of a drill bit. A probability that the well target will be hit is determined using the 3D uncertainty cube. The drilling operations of the well are dynamically re-planned and re-steered based on the updated 3D uncertainty cube, including updating a direction of the drilling operations of the well using the 3D uncertainty cube and the probability. Drilling and acquiring new information are continued to iteratively continue dynamic updates and continued drilling.

The foregoing and other described implementations can each, optionally, include one or more of the following features:

A first feature, combinable with any of the following features, where dynamically updating the 3D uncertainty cube includes reducing, in the 3D uncertainty cube, an uncertainty along a drilled well path around and ahead of the drill bit.

A second feature, combinable with any of the previous or following features, where dynamically updating the 3D uncertainty cube includes reconfiguring the 3D uncertainty cube in light of an actual subsurface structure encountered in the well.

A third feature, combinable with any of the previous or following features, the operations further including repositioning reference surfaces from which the 3D uncertainty cube was derived.

A fourth feature, combinable with any of the previous or following features, where reducing the uncertainty along the drilled well path around and ahead of the drill bit includes reducing the uncertainty to zero or to near zero values.

A fifth feature, combinable with any of the previous or following features, where dynamically updating the 3D uncertainty cube includes using logging while drilling (LWD) information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R. DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN)(for example, using 802.11a b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
generating a three-dimensional (3D) uncertainty cube for a subsurface geological structure containing a well target for drilling operations of a well, the 3D uncertainty cube defining an uncertainty of a geological position relative to a 3D structural model;
dynamically updating, in real time while drilling the well, the 3D uncertainty cube in the subsurface geological structure, including parameterizing the 3D uncertainty cube for a distance ahead of a drill bit used in the drilling operations;
determining, using the 3D uncertainty cube, a probability that the well target will be hit;
dynamically re-planning and re-steering the drilling operations of the well based on the updated 3D uncertainty cube, including:
determining that a wellbore cone of uncertainty of a drilled well path around and ahead of the drill bit is at least partially outside of a geological spatial uncertainty represented by the 3D uncertainty cube, indicating that the well target will be missed by the drill bit;
determining an adjustment for the well path before the drill bit arrives in a vicinity of the well target; and
updating, using the 3D uncertainty cube, the adjustment, and the probability, a direction of the drilling operations of the well; and
continuing with drilling and acquiring new information to iteratively continue dynamic updates and continued drilling.

2. The computer-implemented method of claim 1, wherein dynamically updating the 3D uncertainty cube includes reducing, in the 3D uncertainty cube, an uncertainty along a drilled well path around and ahead of the drill bit.

3. The computer-implemented method of claim 2, wherein dynamically updating the 3D uncertainty cube includes reconfiguring the 3D uncertainty cube in light of an actual subsurface structure encountered in the well.

4. The computer-implemented method of claim 3, further comprising repositioning reference surfaces from which the 3D uncertainty cube was derived.

5. The computer-implemented method of claim 2, wherein reducing the uncertainty along the drilled well path around and ahead of the drill bit includes reducing the uncertainty to zero or to near zero values.

6. The computer-implemented method of claim 1, wherein dynamically updating the 3D uncertainty cube includes using logging while drilling (LWD) information.

7. The computer-implemented method of claim 1, wherein dynamically updating the 3D uncertainty cube includes using a multivariate tri-cubic interpolation algorithm to define a new zero line along a drilling wellbore and generating a new uncertainty description in a volume around the well out to a prescribed radius at which the model remains unperturbed by the new well.

8. A non-transitory, computer-readable medium storing one or more instructions executable by a computer system to perform operations comprising:
generating a three-dimensional (3D) uncertainty cube for a subsurface geological structure containing a well target for drilling operations of a well, the 3D uncertainty cube defining an uncertainty of a geological position relative to a 3D structural model;
dynamically updating, in real time while drilling the well, the 3D uncertainty cube in the subsurface geological structure, including parameterizing the 3D uncertainty cube for a distance ahead of a drill bit used in the drilling operations;
determining, using the 3D uncertainty cube, a probability that the well target will be hit;
dynamically re-planning and re-steering the drilling operations of the well based on the updated 3D uncertainty cube, including:
determining that a wellb ore cone of uncertainty of a drilled well path around and ahead of the drill bit is at least partially outside of a geological spatial uncertainty represented by the 3D uncertainty cube, indicating that the well target will be missed by the drill bit;
determining an adjustment for the well path before the drill bit arrives in a vicinity of the well target; and
updating, using the 3D uncertainty cube, the adjustment, and the probability, a direction of the drilling operations of the well; and
continuing with drilling and acquiring new information to iteratively continue dynamic updates and continued drilling.

9. The non-transitory, computer-readable medium of claim 8, wherein dynamically updating the 3D uncertainty cube includes reducing, in the 3D uncertainty cube, an uncertainty along a drilled well path around and ahead of the drill bit.

10. The non-transitory, computer-readable medium of claim 9, wherein dynamically updating the 3D uncertainty cube includes reconfiguring the 3D uncertainty cube in light of an actual subsurface structure encountered in the well.

11. The non-transitory, computer-readable medium of claim 10, the operations further comprising repositioning reference surfaces from which the 3D uncertainty cube was derived.

12. The non-transitory, computer-readable medium of claim 9, wherein reducing the uncertainty along the drilled well path around and ahead of the drill bit includes reducing the uncertainty to zero or to near zero values.

13. The non-transitory, computer-readable medium of claim 8, wherein dynamically updating the 3D uncertainty cube includes using logging while drilling (LWD) information.

14. The non-transitory, computer-readable medium of claim 8, wherein dynamically updating the 3D uncertainty cube includes using a multivariate tri-cubic interpolation algorithm to define a new zero line along a drilling wellbore and generating a new uncertainty description in a volume around the well out to a prescribed radius at which the model remains unperturbed by the new well.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
generating a three-dimensional (3D) uncertainty cube for a subsurface geological structure containing a well target for drilling operations of a well, the 3D uncertainty cube defining an uncertainty of a geological position relative to a 3D structural model;
dynamically updating, in real time while drilling the well, the 3D uncertainty cube in the subsurface geological structure, including parameterizing the 3D uncertainty cube for a distance ahead of a drill bit used in the drilling operations;
determining, using the 3D uncertainty cube, a probability that the well target will be hit;
dynamically re-planning and re-steering the drilling operations of the well based on the updated 3D uncertainty cube, including:
determining that a wellbore cone of uncertainty of a drilled well path around and ahead of the drill bit is at least partially outside of a geological spatial uncertainty represented by the 3D uncertainty cube, indicating that the well target will be missed by the drill bit;
determining an adjustment for the well path before the drill bit arrives in a vicinity of the well target; and
updating, using the 3D uncertainty cube, the adjustment, and the probability, a direction of the drilling operations of the well; and
continuing with drilling and acquiring new information to iteratively continue dynamic updates and continued drilling.

16. The computer-implemented system of claim 15, wherein dynamically updating the 3D uncertainty cube includes reducing, in the 3D uncertainty cube, an uncertainty along a drilled well path around and ahead of the drill bit.

17. The computer-implemented system of claim 16, wherein dynamically updating the 3D uncertainty cube includes reconfiguring the 3D uncertainty cube in light of an actual subsurface structure encountered in the well.

18. The computer-implemented system of claim 17, the operations further comprising repositioning reference surfaces from which the 3D uncertainty cube was derived.

19. The computer-implemented system of claim 16, wherein reducing the uncertainty along the drilled well path around and ahead of the drill bit includes reducing the uncertainty to zero or to near zero values.

20. The computer-implemented system of claim 15, wherein dynamically updating the 3D uncertainty cube includes using logging while drilling (LWD) information.

* * * * *